No. 874,504. PATENTED DEC. 24, 1907.
J. J. HEYS.
AUTOMATIC BOOT AND SHOE LEVELING MACHINE.
APPLICATION FILED JUNE 19, 1905.

Witnesses:
Sidney E. Taft.
Horace H. Crossman.

Inventor:
John J. Heys
by Emery Booth Temple
Attys.

No. 874,504. PATENTED DEC. 24, 1907.
J. J. HEYS.
AUTOMATIC BOOT AND SHOE LEVELING MACHINE.
APPLICATION FILED JUNE 19, 1905.

Witnesses:
Sydney C. Taft.
Horace A. Crossman.

Inventor:
John J. Heys.
by Emery Booth & Powell.
Attys

No. 874,504. PATENTED DEC. 24, 1907.
J. J. HEYS.
AUTOMATIC BOOT AND SHOE LEVELING MACHINE.
APPLICATION FILED JUNE 19, 1905.

Witnesses:
Sydney C. Taft.
Horace H. Crossman

Inventor:
John J. Heys.
by Emery, Booth Varney
Attys.

UNITED STATES PATENT OFFICE.

JOHN J. HEYS, OF LYNN, MASSACHUSETTS, ASSIGNOR TO MANUFACTURERS MACHINE COMPANY, OF MONTCLAIR, NEW JERSEY, A CORPORATION OF NEW JERSEY.

AUTOMATIC BOOT AND SHOE LEVELING MACHINE.

No. 874,504.   Specification of Letters Patent.   Patented Dec. 24, 1907.

Application filed June 19, 1905. Serial No. 265,844.

*To all whom it may concern:*

Be it known that I, JOHN J. HEYS, a citizen of the United States, residing at Lynn, in the county of Essex and State of Massachusetts, have invented an Improvement in Automatic Boot and Shoe Leveling Machines, of which the following description, in connection with the accompanying drawings, is a specification, like letters on the drawings representing like parts.

This invention relates to machines for leveling or beating out the out soles of boots and shoes. Machines for this purpose as at present generally constructed are of two principal types, known respectively in the art as "direct pressure" and as "automatic" or "roll" machines. The direct pressure machines employ a jack to receive the shoe and opposed to the jack is an iron form, cast and finished to present the desired contour for the sole bottom. This mold is brought directly and under heavy pressure, upon the previously tempered shoe sole, and molds or presses the same into perfect conformity to the mold surface. The molding or "leveling" pressure in such machines is, of course, uniformly and simultaneously distributed over the entire area of the sole to be leveled and is in other respects advantageous because there is no tendency to distort or twist the shoe. Furthermore, any desired contour may be given to the sole by the use of a properly shaped mold.

With direct pressure machines the pressure must necessarily be great in order that when distributed over the large surface to be leveled every part of such surface shall receive a sufficient leveling pressure, and therefore the use of such machines has been confined mostly to McKay sewed shoes which are sewed with the wooden last removed, thus leaving the shoe in readiness to receive a strong iron last such as is really necessary to withstand the heavy direct pressure of such machines.

Attempts have been made to use direct pressure machines in the leveling of welt shoes where the wooden last remains in the shoe practically throughout the period of manufacture but without success. It has been found that the variations in depth of wooden lasts with variations in thickness of stock used have produced such a variation in the leveling pressure that the lasts have frequently been crushed or the shoe damaged. Particularly has this been true where the pressure intended to be distributed over the entire sole to be leveled has, by reason of some inequality or unevenness, been brought to bear upon some one or more comparatively small areas, for in such cases obviously an excess of pressure is received at such point and damage has resulted. These objections have led to the very general use of what is known in the art as the "automatic" leveler, the principal characteristic of which is a leveling roll that is given a rapid and short vibrating movement lengthwise the shoe and is at the same time caused to travel or progress slowly along the shoe sole between the toe and the heel thereof, vibrating rapidly during its progress or travel so that every principal part of the sole is subjected to the action of this roll under a pressure that is always sufficient to perform the work at any one point, but never sufficient to do damage should the depth of last be excessive or should the last be improperly positioned.

Roll machines have usually been provided with a single roll only, and its vibratory and progressive movements have usually been in the direction of the length of the sole. But a roll, the concavity or curvature of which is fitted to the cross-sectional curvature of the sole at one part thereof would not fit that at another portion nor at the more pronounced crown or curvature of the shank. In attempting to correct this fault, the rolls have been canted first to one side and then to the other, split rolls have been used and rolls made up of sections mounted upon flexible shafts intended to fit a sole bottom whatever its curvature, but with unsatisfactory results. Moreover, the application of this pressure at a single constantly varying point in the length of the sole and first at one and then at the opposite side of the sole tends to buckle and twist the sole out of shape.

My invention among other things aims to provide a leveler of the automatic or "roll" type that will more nearly approximate the accuracy of results obtained by direct pressure machines and that shall be open to few, if any, of the faults of the present prevailing types of roll machines.

My invention comprehends many other features and ideas, some of which are applicable to the older type of machines, all of which together with the foregoing, will be more clearly understood and appreciated from a detailed description of a machine illustrating one embodiment of my invention. It is to be understood, however, that my invention is not limited to the embodiment here selected for illustrative purposes.

In the drawings,—Figure 1 in side elevation shows a machine illustrating one embodiment of my invention.

My invention for illustrative purposes herein, is embodied in two like machines, arranged side by side, each quite independent of the other, and each operable independently of the other, but, for convenience in construction, I have omitted what would be the adjacent side frames of the two machines, and have continued the shafts and some of the supports continuously from one outside frame to the other, this being a mere convenience however and not a necessary construction. Since these machines are similar in all respects, it is necessary to describe but one herein, it being understood that like letters represent like parts, operating in like manner in the two machines.

Figure 1:
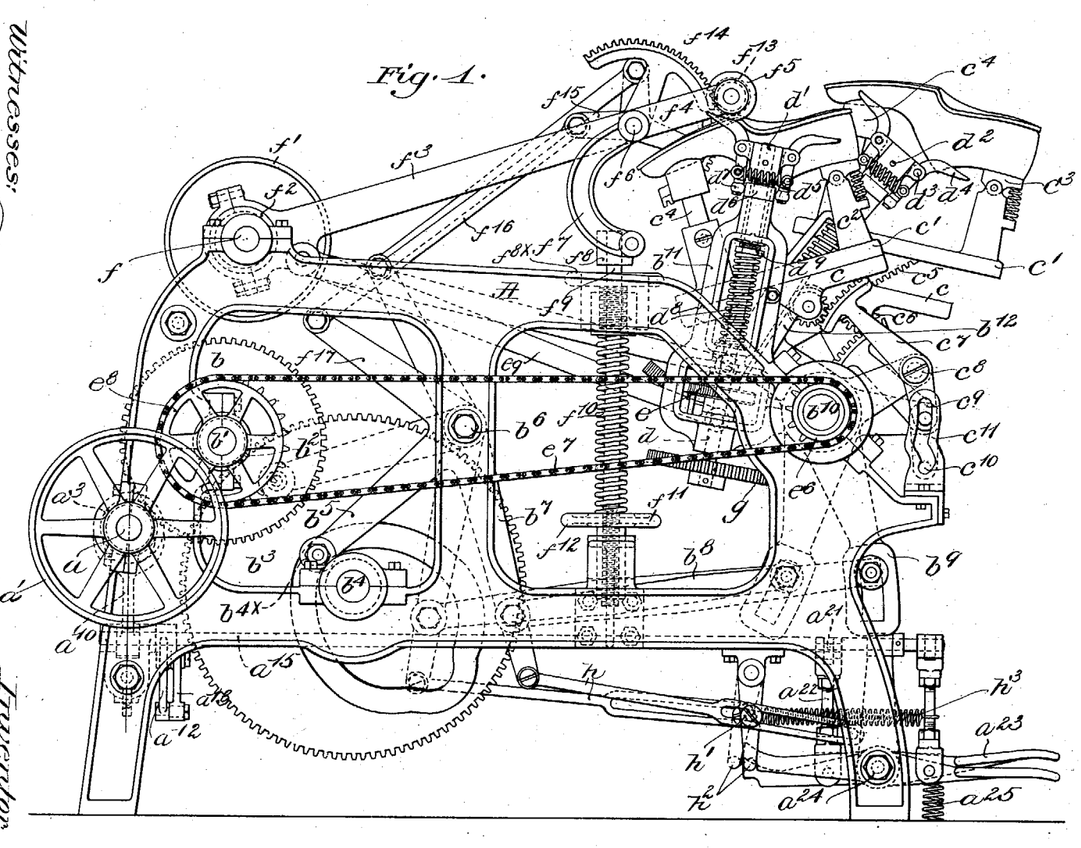
Figure 3:
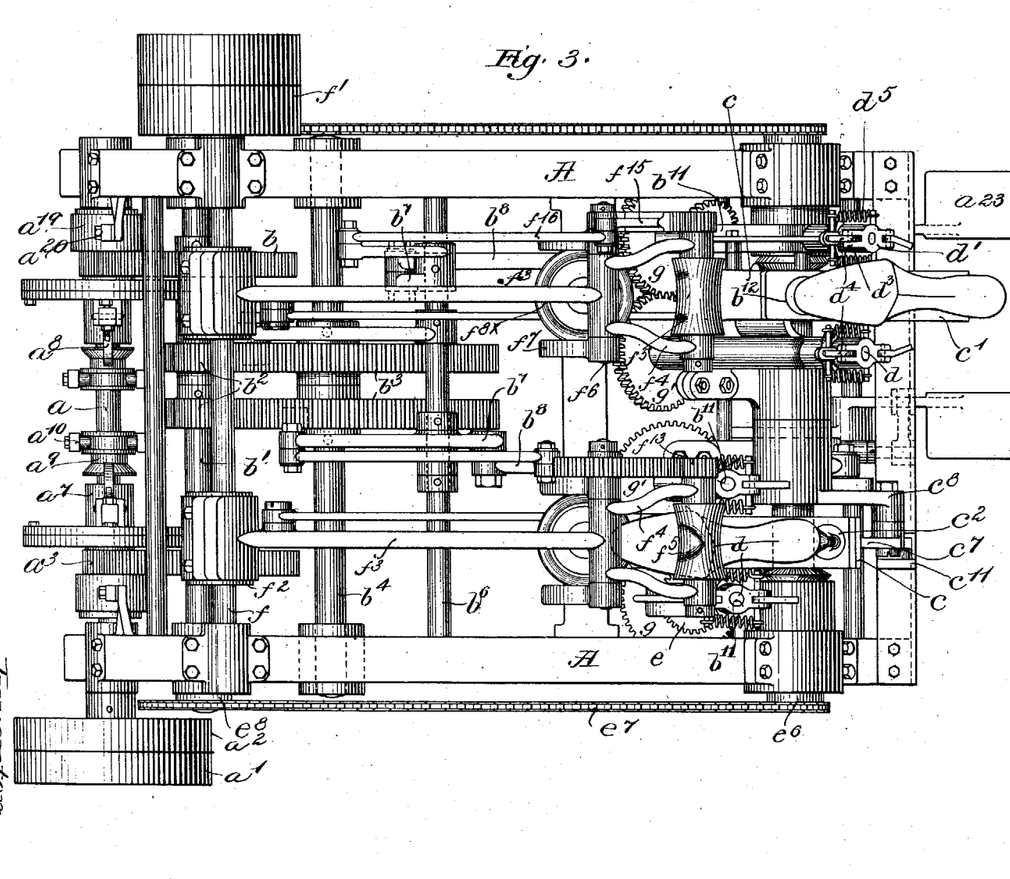
Fig. 3 is a top or plan view of the machine shown in Figs. 1 and 2.

The side frames are shown at A, they being provided at their rear ends, at the left of Fig. 1 and 3, with suitable bearings for the main or drive shaft $a$, having one of its ends extended beyond the adjacent side frame (see Fig. 3) to receive usual fast and loose pulleys $a'$, $a^2$ by which the machines may be belted to and driven from any suitable power or counter shaft. Loosely mounted on the drive shaft $a$ are the driving pinions $a^3$,—one for each machine,—and each of these pinions is provided at its inner end (see Fig. 6) with a large friction flange $a^4$, which is embraced at its periphery by the opposed and relatively movable friction members $a^5$, $a^6$ of a friction clutch. The friction member $a^5$ embraces the periphery of the pinion flange and is supported, at the same side thereof as the friction member $a^6$, upon and preferably forms a part of the sleeve $a^7$ splined upon the drive shaft. This sleeve $a^7$ is provided with suitable fulcrum supports for the clutch levers $a^8$ that engage at one of their ends, the friction member $a^6$ and at their other or tail ends, overlie the inclined flange of the sliding collar $a^9$ grooved circumferentially to receive the forked end of the clutch lever $a^{10}$. This clutch lever is mounted upon the horizontal pivot $a^{11}$ supported in the frame and is provided with an arm $a^{12}$, joined by a link $a^{13}$ to a short arm $a^{14}$ on the horizontal actuating shaft $a^{15}$, also mounted in the frame. This shaft carries at its opposite side an arm $a^{16}$; and to the upper end of this arm is joined a brake actuating yoke $a^{17}$ (see Figs. 6 and 7), the arms of which converge and embrace the wedge-shaped ends $a^{18}$ of a brake band $a^{19}$ suspended from above at the point $a^{20}$ and encircling the smooth braking portion of the pinion $a^3$.

Obviously, if the horizontal actuating shaft $a^{15}$ be rocked in the direction of the arrow (Fig. 6), it will cause the sleeve $a^9$ to slide toward the middle of the machine and by spreading the tails of the clutch levers, clutch the splined hub $a^7$ to the pinion flange $a^4$ and cause the latter to rotate in unison with it. This same rocking movement of the said actuating shaft $a^{15}$ lifts the yoke $a^{17}$ and releases the ends of the band brake permitting the latter to spring outward away from and to release the pinion.

Figure 6:
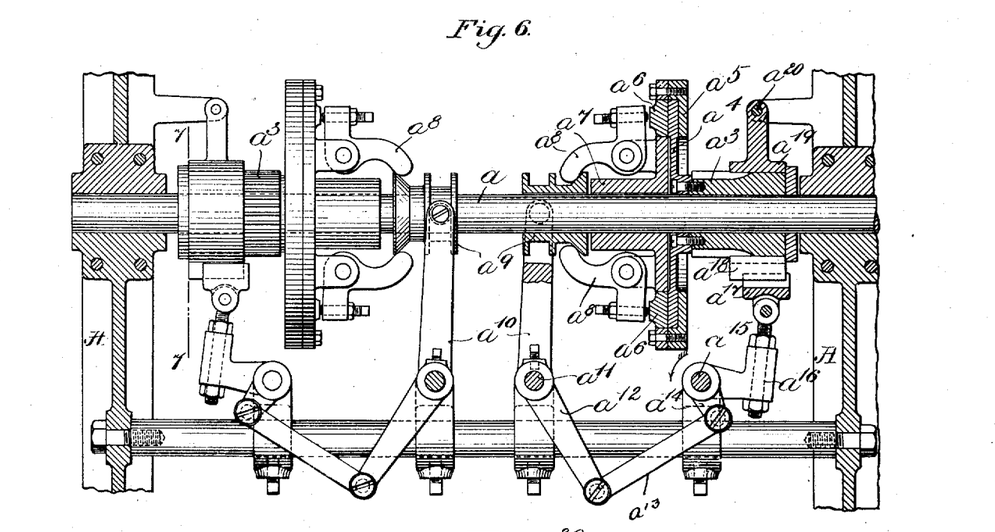
Fig. 6 is an enlarged detail, partially in section, showing the arrangement of clutch devices for starting and stopping the machine, employed in the embodiment of my invention here shown.
Figure 7:
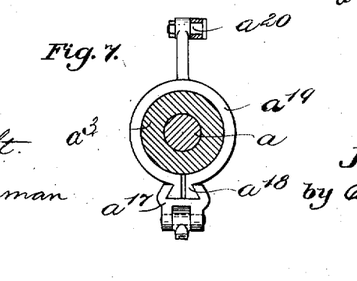
Fig. 7 is a sectional detail on the dotted line 7—7, Fig. 6.

Reverse rotation of the actuating shaft $a^{15}$ will release the clutch and apply the brake. In lieu of the clutch and brake mechanism here shown, any other suitable clutch and brake or driving device, or fast and loose pulleys may be employed.

Figure 2:
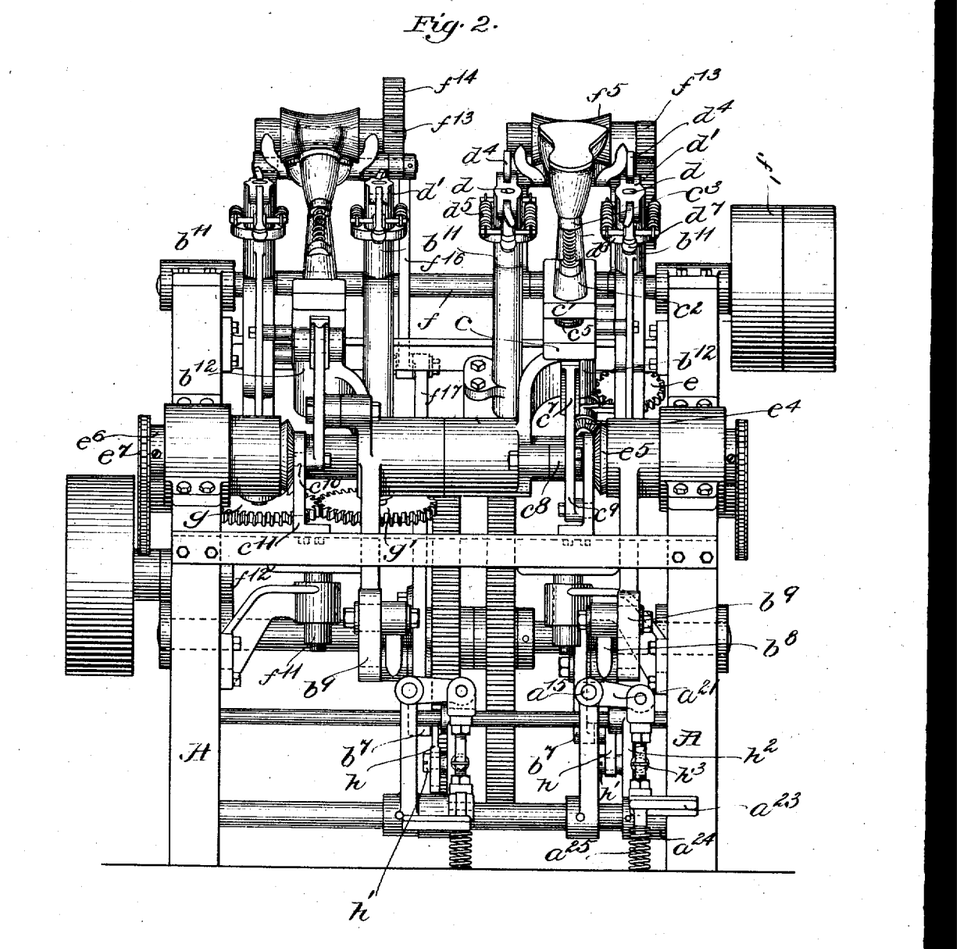
Fig. 2 is a righthand end or front elevation of the machine shown in Fig. 1.

The actuating shaft $a^{15}$ is extended to the front of the machine where (see Fig. 2) it is provided with a laterally extended arm $a^{21}$, connected by a link $a^{22}$ with a treadle $a^{23}$, fulcrumed at $a^{24}$ and supported from below by a spring $a^{25}$. Depression of this treadle causes the drive shaft to be clutched to its pinion and the brake to be released, while release of the treadle unclutches the pinion and applies the brake.

Referring now to Fig. 1, the driving pinion $a^3$ meshes with and drives the larger toothed wheel $b$, fast upon the horizontal shaft $b'$ journaled in the frame. This shaft $b'$ also carries the small pinion $b^2$ that meshes with and drives the large cam wheel $b^3$ loose upon the horizontal shaft $b^4$ journaled in the frame. This cam wheel has formed in one of its side faces a suitable jack actuating path-cam, shown best in Fig. 1, which receives the roller stud $b^{4\times}$ on the arm $b^5$ fulcrumed in the frame at $b^6$ and provided with the depending arm $b^7$. This depending arm $b^7$ is connected by a link or connecting rod $b^8$ with the lower, slotted end of the jack actuating arm $b^9$, fulcrumed loosely upon the shaft $b^{10}$, itself loosely mounted in the frame. By varying the point of connection of the link $b^8$ with the slotted end of the jack lever $b^9$, the extent of oscillation of the jack lever and its jack may be varied as required.

The jack lever $b^9$ (see Fig. 4) is provided above its shaft $b^{10}$ with three upwardly inclined and substantially parallel members, the two outer of which are marked $b^{11}$ in the drawing, and the middle of which is marked $b^{12}$.

Figure 4:
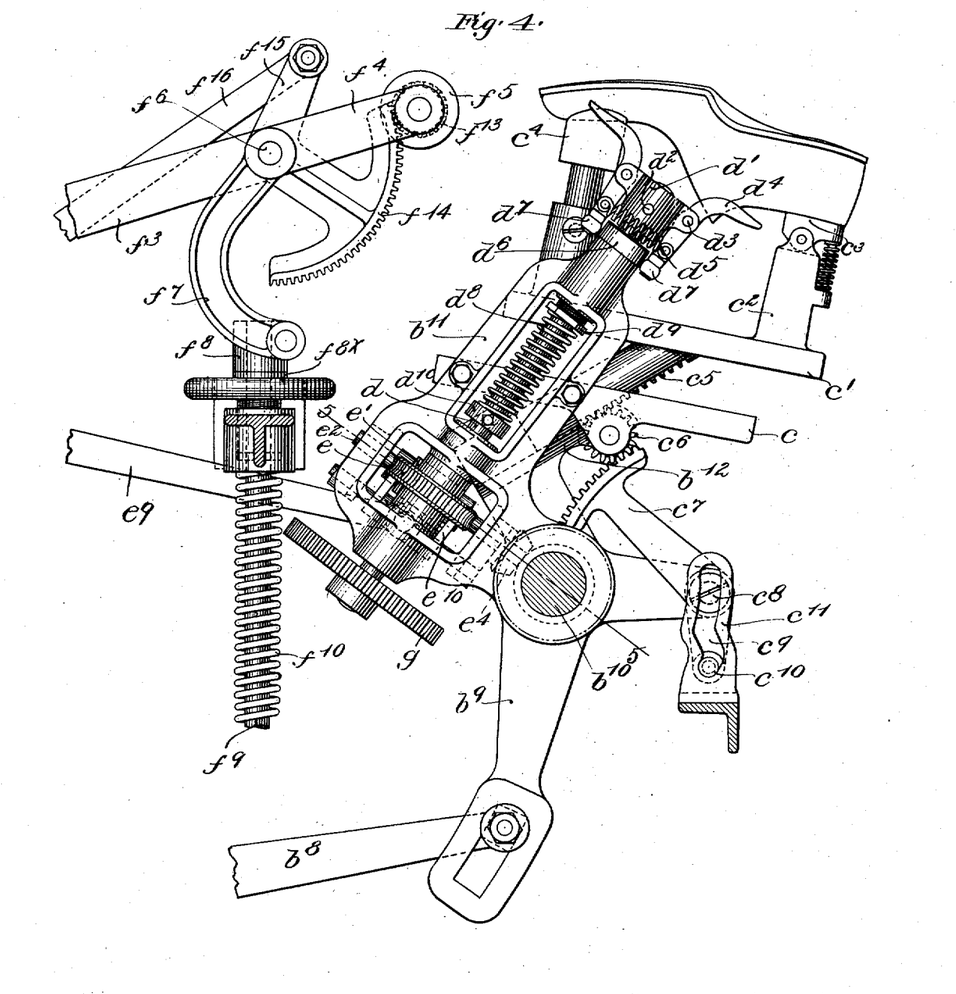
Fig. 4 is an enlarged detail and diagrammatic view illustrating the movements of the jack in presenting the leveled shoe for removal by the operator at the end of the leveling operation.

The middle member $b^{12}$ is provided at its upper end with an obliquely arranged table $c$ upon which rests the base $c'$ of the shoe support or jack. This jack may be of any suitable or desired construction, but as herein illustrated it comprises a heel post $c^2$ provided at its upper end with a usual spring controlled and fulcrumed heel supporting pin $c^3$ and an adjustable toe support $c^4$. The last, carrying a shoe the sole of which is to be leveled or beat out, is supported in usual manner by and upon this jack.

The jack base $c'$ is provided with a downwardly and obliquely extended guide rack $c^5$, shown best in Fig. 4, arranged to slide in a suitable guide-way provided therefor in the jack supporting member $b^{12}$. The rack face of this guide is in mesh with the toothed wheel $c^6$ loosely mounted in the said jack supporting member $b^{12}$, said pinion in turn being engaged by a segmental gear $c^7$, fulcrumed at $c^8$ in an arm of the jack carrying lever $b^9$. This segmental gear has a depending arm $c^9$ carrying at its lower end a roller $c^{10}$, which, as the jack is oscillated about its fulcrum $b^{10}$ is caused to rise and fall in the stationary slot cam $c^{11}$ suitably supported upon the frame. This slot cam is so shaped, with an offset at its lower end that, as the jack is oscillated to the right, Fig. 1, toward the operator, just before it reaches the limit of its outward movement, the roller $c^{10}$ will reach the offset and will cause a quick inward movement of the segmental gear $c^7$, thereby through the pinion $c^6$ to cause the rack guide $c^5$ to be slid outward and upward carrying with it the jack base, jack and shoe thereon. The effect of this is to project the shoe diagonally upward and forward toward the operator, completely above the rolling or leveling devices to be described and into convenient position for removal of the shoe and the placing of a new shoe thereon. Return movement of the jack, causes the same to be returned to its lowermost position to present the shoe to be operated upon by the leveling devices.

As stated in the preamble, it has been customary heretofore in machines of this type so far as known to me, to level the shank by a roller or device that traverses from toe to heel of the shoe or vice versa in a line substantially parallel with the longitudinal median line of the last and it will be understood that by leveling means I mean any tool or device that is adapted to shape the sole of a shoe by its action thereon or in coöperation with the shape or form of the last.

My invention contemplates shank leveling means that enter upon or leave the sole upon the last from the side thereof whereby I obtain an entirely novel effect in leveling machines.

Figure 10:
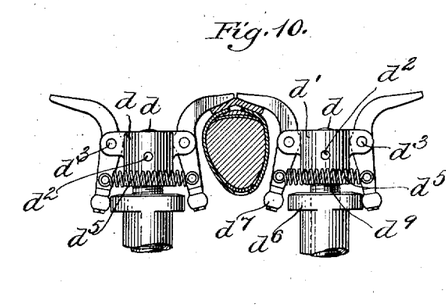
Fig. 10 a heel end view and partial section showing the shank levelers in action, and Fig. 11, a series of cross-sections on as many dotted lines, Fig. 8, showing the varying angular position assumed by the shank levelers illustrating my invention.

As herein shown, both the outer members $b^{11}$ of the jack carrying lever $b^9$,—that is, the two members between which the jack supporting member has been stated to be located,—are provided respectively with upright and slightly inclined bearings for the shank leveler shafts $d$. These shafts, of course, swing or oscillate with the jack, since their bearings are virtually a part of the jack carrying lever, and each of said shafts is provided at its upper end (see Fig. 4) with a head $d'$ fast thereon preferably by a pin, $d^2$, which head is provided with oppositely extended ears between which are fulcrumed at $d^3$ the shank levelers or tools $d^4$. The upper and nearly horizontal arms of these levers, which may be detachable, as shown, are suitably shaped at their under sides and preferably rounded, to adapt them to sweep over and upon the shank of the sole to be leveled; while the lower arms thereof lying substantially parallel with the shaft $d$ are drawn together by the pair of springs $d^5$ (see Fig. 10). Obviously, the action of these springs is to press the upper and nearly horizontal leveler arms frictionally upon the shank of the sole for the proper leveling thereof.

The lower ends of the spring controlled shank leveler arms are fitted with rollers $d^7$ that travel upon a cam $d^6$ shaped as desired to cause said arms to be drawn apart against the action of the controlling springs, thereby to lift the active leveler arms out of operative contact with or away from the shank of the sole. The shape of this cam may be such as to permit the active leveler arms to remain in full contact with the shank during the entire sweep thereof over the shank face, and to be raised only upon leaving the said shank and to facilitate re-approach of the same to the shank, or, the said cam may be shaped so as to vary the spring pressure of the leveler arms upon the shank during the sweep thereof over the shank surface.

I have obtained excellent results by leaving the shank levelers wholly under the influence of the springs $d^5$ during the entire effective sweep, that is, during the period in which the devices traverse the shank face, using the cam merely to lift the shank levelers preparatory to and to facilitate their initial contact with the shank and their withdrawal.

The entire shaft $d$, shank levelers and all, are themselves spring supported by a spring $d^8$ encircling the shaft, seated at its upper end upon the threaded and adjustable sleeve $d^9$ and acting at its lower end against the collar $d^{10}$, fast on the said shaft. Any lifting of the levelers $d^4$ that cannot conveniently be permitted by the leveler springs $d^5$ will lift the entire shaft,—levelers and all,—compressing this spring $d^8$. This prevents any possible damage to the shoe or to the leveling devices.

To rotate the shaft $d$ and cause the inward sweep of the shank levelers, I provide said shaft near its lower end with a worm wheel $e$ (see Fig. 5) driven at its inner side by a worm $e'$, mounted on the worm shaft $e^2$ to rotate and also to slide longitudinally thereof, said shaft $e^2$ being supported in suitable bearings $e^3$ in the jack carrying lever. This worm shaft at its front end (see Figs. 4 and 5) is provided with a bevel gear $e^4$ driven by a bevel gear $e^5$, fast upon the jack shaft $b^{10}$, about which the jack carrying lever freely swings. This jack shaft is provided at one end with a sprocket wheel $e^6$ connected by a sprocket chain $e^7$ with a driving sprocket $e^8$ fast on the horizontal shaft $b'$ near the rear of the machine. Thus, rotation of the said shaft $b'$ by the drive shaft and connected by the mechanism described to and for oscillating the jack, likewise rotates the jack carrying shaft $b^{10}$ and through the worm and worm wheel described, rotates the shank leveler shaft $d$ and its levelers at the proper and relatively slow speed to cause them slowly to sweep over the shank of the shoe upon the jack. To give these shank levelers short and quick vibrating movements in addition to the progressive movements, which vibrations by said progressive movements shall be caused gradually to traverse the entire surface of the shank, I cause the worm $e'$, heretofore stated to be mounted to slide on its shaft $e^2$, to be given a rapid sliding or endwise reciprocation. The mechanism for doing this will be more clearly understood from a later description, but it suffices at this point to state that this rapid reciprocation of the worm causes a rapid rotary reciprocation of the worm wheel and therefore a rapid vibration of the shank levelers without in the least interfering with the worm and worm wheel progressive rotation of the said levelers to cause them to traverse the entire shank.

Referring again to Fig. 1, the side frames A at the upper and rear of the machine have suitable bearings for the horizontal eccentric shaft $f$, provided with the belt pulley $f'$ that is preferably separately belted to the power or counter shaft. This is because its rotation is required to be so much more rapid than that of the main drive shaft $a$ that it is inconvenient to drive it from the said drive shaft direct or by any speed reduction mechanism that could be conveniently arranged in a frame of the size herein used. Obviously, however, the particular means for driving this shaft may be varied as desired. This eccentric shaft is provided (see Fig. 3) with a broad eccentric $f^2$, the eccentric strap of which has a forwardly and upwardly inclined arm $f^3$, the forward end of which is provided with a roll carrying yoke $f^4$ (see Figs. 1 and 3), between the arms of which is journaled the fore-part leveling roll $f^5$. To support this fore-part roll and at the same time furnish means for pressing the same yieldingly upon the fore-part of the sole, the said eccentric arm $f^3$, near and preferably at the base of the yoke $f^4$ is provided with a cross shaft $f^6$, the extended ends of which are loosely mounted in the upper ends of the two curved supporting links $f^7$. These links at their lower ends are joined to the head $f^8$ upon the upper end of the substantially vertical spring rod $f^9$, mounted to rise and fall in suitable bearings in the frame. Encircling this rod is a strong spring $f^{10}$, seated at its upper end upon one of the frame bearings and at its lower end acting against a conveniently adjustable nut $f^{11}$, shown as provided with a hand wheel $f^{12}$ and threaded upon the lower end of the spring rod $f^9$. By adjusting this hand wheel nut $f^{11}$, the tension of the spring $f^{10}$ may be varied and thereby the resultant pressure of the fore-part roll upon the fore-part of the shoe sole. When the shoe is removed the under side of the head $f^8$ seats upon an adjustable wheel nut $f^{8\times}$ and furnishes a support for the fore-part roll, $f^5$ so that the rapid reciprocations thereof by the eccentric may be continued uninterruptedly, even when the shoe is removed from the machine.

Hertofore in levelers employing a fore-part roll, said roll has been made truly and concentrically circular at all points, although of varying diameter or concavity to fit approximately the transverse curvature of the fore-part of the sole. The bottom transverse curvature of the fore-part of the last, however, varies constantly from the toe to the shank, being usually more pronounced at a point intermediate the toe and shank, ordinarily presenting a nearly flat face in the immediate vicinity of the toe and a low crown or curvature adjacent the shank. Hence, a roll of fixed curvature or concavity can at best accurately fit the curvature of the sole or last bottom at one point only in the length of the fore-part, such curvature merely approximating the other portions of the last bottom. Attempts to correct this error have led to a quite general custom of canting the roll carrying yoke so that it may be operated first along one side of the fore-part, then along the other side and finally down the middle or otherwise, but even then there can be but an approximation to the transverse curvature of the last bottom.

Figure 12:
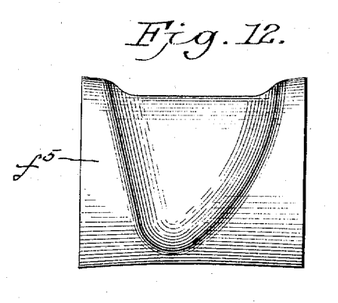
Fig. 12 is a detail view of the leveling device or roll showing more clearly the circumferential pattern extending about it.

My present invention contemplates the use of a fore-part leveling roll having a varying surface contour extending circumferentially thereof and which for identification may be denominated a "pattern surface", as best shown in Fig. 12—so that as it rolls along the fore-part bottom or other portion of the shoe sole to be treated, it fits or gives the curvature of or to the latter at all points as accurately, it may be, as would a predeterminately molded die such as used in direct pressure leveling machines.

As will be readily understood from the foregoing, and the detailed view of Fig. 12, a cross section of this roll constitutes a former to shape the sole operated upon and has its surface more or less eccentric relative to its axis, the curvature at the different portions of its acting face being the converse of that of the last from the toe to the shank or ball line of the sole and is thereby adapted correspondingly to form or shape the sole with which it is brought in contact as it is simultaneously oscillated or progressively moved upon it, as will hereinafter more fully appear. For the best results the diameter of this roll should be such that it will preferably make one complete revolution in its traverse from the tip of the toe to the beginning of the shank of the sole and will thus give to the latter a perfectly accurate and predetermined curvature at all points, notwithstanding said roll is oscillated or vibrated rapidly back and forth, during its progression or travel along the sole.

If it is not convenient to employ a roll of such diameter, a smaller one may be used with suitable means for causing it to make but one complete rotation during the entire fore and aft travel along the fore-part and, while this would involve a slip of the roll during its travel, such slip would not necessarily be detrimental; on the contrary, it would be considered by some to be distinctly advantageous because it would provide a wiping action that approximates the hand operation of "long sticking" the sole. To produce such positive and fixed rotation of the leveling roll, or, in other words, to control its rotative movement during its fore and aft travel along the sole, I have provided the same herein with a pinion $f^{13}$, driven by a segmental gear $f^{14}$ fulcrumed upon the cross shaft $f^6$ at the base of the roll carrying yoke. This shaft has a laterally extended arm $f^{15}$ connected by a rod $f^{16}$ with an arm $f^{17}$ forming a part of the cam actuated lever $b^5$ which oscillates the jack and which therefore oscillates said segmental gear and its rod. By thus positively rotating or controlling the rotation of the leveling roll in time with and from the same mechanism that oscillates the jack, it is possible to use a molded or pattern surface roll that will cause a predetermined curvature to be given to the sole at any point between the toe and the shank by a pattern leveling action, as will be fully understood.

From the construction described with respect to the leveling roll, which, for illustrative purposes I have selected as a fore-part leveling device, it will be apparent to those skilled in the art that as the said device and work support are relatively moved to subject different portions of the sole to the leveling operation, the rotative movement of the leveling roll is so controlled that different portions of its pattern surface may be brought into working relation with the sole corresponding to the transverse and longitudinal shape thereof at any point; and, further, that while in such working relation the portion of the sole being treated may be subjected to attritive action by a pattern surface corresponding to the sole contour desired. It will also be noted that as the work support and leveling device are relatively moved or progressed to bring all desired parts of the sole into position for leveling, the circumferentially pattern surfaced roll is progressively and controllably rotated to successively present the proper pattern surface to the sole throughout its extent, and that as each portion of the pattern surface of the roll is thus progressively brought into working position, the sole is subjected to a rubbing or attritive action.

The same eccentric $f^2$ that imparts this rapid vibration of the fore-part leveling roll is utilized to give the rapid endwise reciprocation to the worm $e^2$, already referred to, by connecting the eccentric arm $f^3$ by a long rod $e^9$ with a yoke $e^{10}$ loosely surrounding the worm shaft and embracing the ends of the worm thereof. Thus, the fore-part leveling roll and the shank levelers vibrate in unison, producing a smooth and perfectly harmonious action of the rapidly moving parts of the machine.

The operation of leveling a shoe upon my improved machine is as follows:—Assuming the jack to be in its elevated and forward position, as in Fig. 4 and at the extreme right Fig. 1, the operator jacks a shoe thereon and, placing his foot on the treadle starts the machine. As the cam wheel $b^3$ commences to rotate, the abrupt throw in its path cam causes immediate and quick movement of its cam lever $b^5$ to the right (Fig. 1), thereby through the connecting rod $b^8$ imparting a similarly quick inward movement to the jack. As the jack is thus thrown inward its arm, carrying the segmental gear $c^7$ is thrown upward causing the roller stud $c^{10}$ thereon to traverse the abrupt offset portion of the slot cam $c^{11}$ and, by swinging the segmental gear, causes it to operate through its pinion $c^6$ and the rack $c^5$ to drop the jacked shoe quickly into operative or the lower position shown in Fig. 1. This combined inward and downward movement of the jack takes place so quickly that the shoe reaches its operative position before either of the side levelers in its lateral swinging or sweeping movement reaches a position where it would either obstruct or contact with the shoe.

From the initial operative position shown in Fig. 1, in the subsequent operation of the machine said jack is gradually and automatically oscillated to the left or inward, causing the fore-part roll $f^5$ gradually to progress along the fore-part toward the shank.

While it is possible to have the vibrating side levelers rotate or sweep inwardly and towards the heel, I prefer that they sweep away from the heel and towards the body part or ball of the shoe starting from a point forward of the breast of the heel, because by progressing in such direction they will come onto the sole more easily and leave it more naturally and with less liability of destruction or damage.

Since the side levelers oscillate forward and backward with the jack, it is immaterial in which direction they progress so far as the fore-part leveling roll is concerned, for their action is due to the progressive rotation about the axis of the shaft $d$ rather than to any relative travel or movement between said shaft and the jack.

The jack continues its inward oscillating movement until the break in the sole at the beginning of the shank, reaches the leveling roll when the cam wheel $b^3$ reverses the movement of the cam lever $b^5$ and causes the jack thereafter gradually to swing outward and toward the operator, the side levelers always following the jack movement. When the fore-part leveling roll again reaches the toe of the shoe, the cam $b^3$ gives to the jack a quick impulse forward to cause the roller $c^{10}$ to enter the abrupt offset portion of its stationary slot cam $c^{11}$, and project the jack upwardly in front of the operator, as described, free and clear of the fore-part roll and shank levelers to enable the shoe conveniently to be changed. This abrupt and final movement of the jack that projects the shoe into its elevated position for removal, I also utilize to stop the cam wheel $b^3$ and arrest all progressive movements in the machine, leaving only the rapid vibratory movements of the leveling device to continue. I accomplish this by prolonging the end of the jack actuating lever $b^7$ and connecting to its lower end a rod $h$ that extends toward the front of the machine and is there slotted to receive a stud $h'$ on the depending lock lever $h^2$ normally drawn by a spring $h^3$ to the right into position to engage and lock the treadle $a^{23}$ in its depressed position. When the said jack actuating lever $b^7$ is thrown abruptly to the left (Fig. 1) to cause the jack to be projected into its elevated position, as described, the end of the slot in the rod $h$, which, by the gradual throw of the jack has been brought up to the stud $h'$, engages the said stud and swings the locking lever $h^2$ to the left into its dotted position (Fig. 1) to release the treadle $a^{23}$ and permit its spring $a^{25}$ to lift it to unclutch the driving shaft and stop all but the vibratory movements of the leveling devices.

Right and left shoes ordinarily have the line of break between the fore-part and the shank extended diagonally at opposite angles, so that the fore-part length along the outer side of the sole is longer and the shank length shorter than at the inner side of the sole, and this difference in length of the fore-part and shank at the outer, as compared with the inner side of the sole, varies constantly with different lasts according to the degree of swing or style of the last. It is therefore impracticable to have two shank leveler shafts $d$ that stand at opposite sides of the last or shoe always one directly opposite the other. It is necessary that one or both the shank leveler shafts be adjustable, in order that one or the other may be placed in advance of or behind the other so that its tool or tools may meet or leave the shank at its side of the shoe wherever said shank may begin or end.

Figure 5:
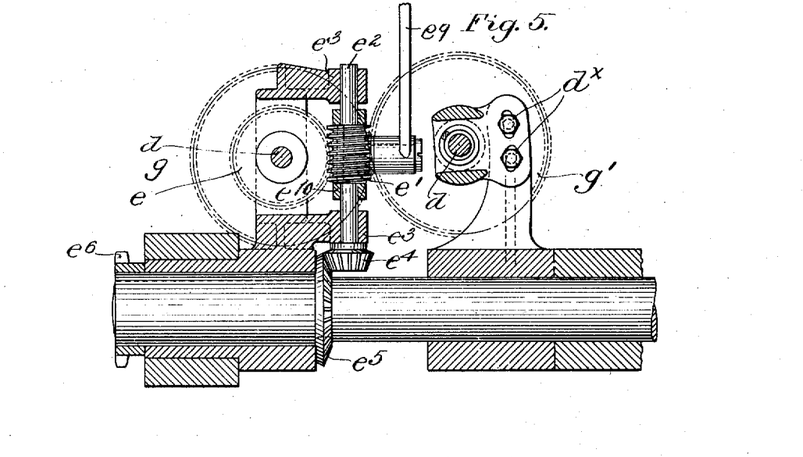
Fig. 5 is a cross-sectional detail on the dotted line 5—5, Fig. 4, showing the worm and worm wheel connections and means for reciprocating the worm, to give the desired movements to the shank leveling devices.

I have found in practice that it is sufficient if the inner shank leveler shaft $d$ that stands at the inner side of the shoe alone be made adjustable, for by making it adjustable, it matters not whether a shoe leveled on that particular jack be a right or a left shoe; this inner shaft may be set inward or outward as may be necessary to cause its shank levelers to meet or leave the shank at the proper point, with the shoe positioned so that the outer shank leveler will properly act upon the outer side of the shank. The means that I have provided for thus adjusting the inner shaft $d$ is shown in Fig. 5. Referring to said figure, said shaft $d$ has its bearings provided with laterally extended flanges that rest upon supporting arms carried by the jack and that are in tongue and groove engagement therewith, said tongues and grooves being in the arcs of circles above the axis of the shaft $d$ as a center. These supporting arms are slotted as indicated in Fig. 5, to receive suitable clamping devices, as the bolts $d^\times$, whereby the position of the said inner shaft $d$ may be determined and fixed as occasion may require.

While the two shafts $d$ may be independently driven from a common operating shaft, I find it convenient to drive one shaft only by the worm and worm wheel described and to provide the lower end of said shaft with a gear wheel $g$ that meshes with a mating wheel $g'$ on the opposite or mating shaft. The two shafts are thus rotated in unison but in opposite directions, so that the progressive sweeps of the tools at opposite sides of the shank will be in unison, both commencing at the heel or the fore-part end of the shank and progressing gradually towards the opposite end of the shank. The rapid vibrations of the side levelers upon the one shaft $d$ due to the endwise reciprocations of the worm $e'$, are also transmitted by the connecting gears $g$, $g'$ to the opposite shaft $d$, thus greatly simplifying the actuating mechanism for the shank levelers.

Figures 8, 9:
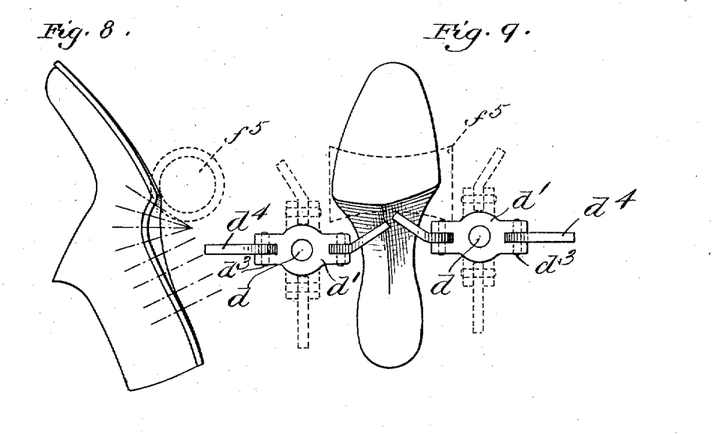
Figs. 8 and 9, diagrammatic side and bottom views of a shoe showing relative positions assumed by the leveling devices.
Figure 11:
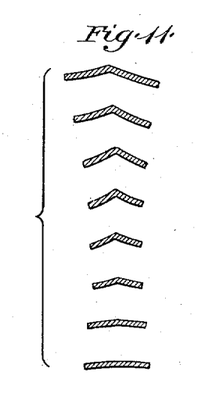

In the majority of instances the peculiar and novel movements given to the side levelers $d^4$ will cause the same when of like shape, to act properly upon all portions of their respective sides of the shank, as will be evident from an inspection of Figs. 8 and 11, where it will be seen that the same tool will fit substantially all pitches of either shank side. If, however, it be found that when of like shape they will not reach all portions of the shank that they should reach, my invention contemplates the use of differently shaped levelers connected with the same side shaft $d$, one of which will be shaped to act properly upon given portions of its side of the shank, and the other upon other portions thereof. In fact, as many shank levelers may be employed as desired, each similarly shaped, or differently shaped from the others, as may be necessary to obtain the desired results, and the cam $d^6$ may be shaped still further to modify the effective sweep of any one of the shank levelers. By using two shank levelers only upon the same shaft $d$ and so timing the mechanism that when their progressive or rotary motion is arrested, at the completion of the leveling operation they will stand parallel, or substantially so, with the fore and aft length of the shoe, the shoe may be readily projected upward from between the two shafts and again downwardly into operative position, without interference with or from said shank levelers. In fact, in practice I prefer that when two shank levelers only are employed they be arranged not diametrically opposite one to the other, but at an angle of more than 180° one relative to the other, with the larger angle when they are stopped at the inner side next the shoe so as to insure sufficient clearance for the shoe in placing it in and removing it from operative position.

While I have herein shown two machines associated together, obviously three or more might be associated according to the ability of the operator to handle the shoes and the speed at which the machine is operated. However this may be, as at present arranged, each machine is complete in itself and performs its own cycle of operations without interference from, or modification of, its movements by the adjoining machine. When the shoe is jacked for leveling, the machine positions the shoe, performs its complete leveling operation and again presents the shoe for removal and stops all automatically and remains at rest until the operator removes the shoe, positions another, and again starts the machine.

It will be obvious from the foregoing description how much better adapted the machine illustrating my invention is for leveling all shapes of shoe soles, in the vicinity of the shanks thereof as well as the fore parts, than the ordinary roller leveler as at present constructed and used. The advantages of my invention are more fully realized and availed of in connection with the most pronounced and unusual shoe shanks. In fact, the well-known "Cottage" shank which presents a distinct ridge along its median line, falling off abruptly at either side thereof, and which it is impossible practically to level upon the present commercial roller levelers, are accommodated by the machine illustrating my invention with perfect ease. So far as I am aware, I am the first to use one or more levelers having a progressive movement, or sweeping inward and outward from and at the sides of the shoe, contra-distinguished from a leveler having its progressive movement only fore and aft of the shoe between the toe and the heel thereof. This novel movement enables the leveler to enter and leave the work in such a way as to meet almost any conceivable cross-sectional curvature or shape at any point in the length thereof and without danger of marring the sharpness of the line of break of the ball of the sole. Furthermore, the leveling devices may be worked simultaneously. This insures the holding of the shoe firmly at the fore-part and heel to prevent its buckling or curling between its ends, and since the levelers work substantially equally at both sides the median or longitudinal line of the shoe, there is no tendency to twist the shoe laterally or torsionally or to shift it first to one and then to the other side upon the jack as with the ordinary roller leveler which is so detrimental and serious in the higher grades of light shoes made upon pronounced lasts that frequently such shoes must be leveled by hand. As herein illustrated, I employ a fore-part leveling roll and shank levelers that are wipers. It is of decided advantage to be able to employ in one machine wipers at the shank and a roll at the fore-part, it having been found that wipers are more effective in some classes of work in the shank than rollers would be, and that a fore-part roller when properly controlled is sufficient for the average work but the invention is not restricted to such arrangements or uses, as will be well understood by those skilled in the art.

The position of the axis of the shank leveler shafts $d$ relative to the shoe sole may be changed as desired, either by adjusting the shaft bearings or the jack to give to the sole a different pitch. The latter method is the simpler and is the one herein used. Of course by varying this angle or pitch the approach of the shank levelers to and the rise of the same from the shoe sole may be considerably varied so as to adapt the action of the tools to the peculiarities of the shanks as they may from time to time vary.

So far as known to me I am the first to provide a leveling machine wherein a leveling device is caused, either by movement of the jack or of the leveling device, or both, to traverse the sole surface to be leveled in a direction oblique to the length of the sole, contra-distinguished from machines of this type that so far as known to me invariably cause the roll to traverse or progress over the shoe sole in the direction of the length thereof and having merely means permitting it to adapt itself to the various cross-sectional curvatures in the sole, but without at any time altering its general fore and aft movement parallel with the length of the shoe. Consequently, my invention is not restricted to any particular mechanism for obtaining this novel and oblique path of travel across the sole and which is important in reaching and properly acting upon the portions of the shank immediately adjacent the break between the shank and the forepart. In the embodiment of my invention herein shown this oblique means is a constantly changing one, due to the rotative movement of the leveler, but while this is advantageous in that it gives greater capacity to adapt the leveler to the constantly changing shank surface, it is not essential.

By the improved character of fore-part leveling device and its described control it will be clear to those skilled in the art, that it can be caused to progressively present different portions of its pattern surface to the work and while in such position relative oscillations can be imparted between the work support and such leveling device to properly act upon the shoe sole at the particular part by an oscillated patterned treatment.

The shoe holding means, or means for supporting a shoe when presenting it to be worked upon, is commonly called a "jack" and the term jack as used in the claims is used in this sense and includes any form of shoe holding or shoe supporting means, whatever be its construction.

My invention is not limited to the particular embodiment thereof herein illustrated and described, but may be varied widely within the spirit and scope of my invention.

I claim—

1. A leveling machine provided with a jack, leveling means, and means to change the relative positions thereof to cause said leveling means to enter upon or leave the shoe sole at the side thereof.

2. A leveling machine provided with a jack, vibratable shank leveling means, and means to change the relative positions thereof to cause the vibrations of said shank leveling means to enter upon or leave the sole at the side thereof.

3. A leveling machine provided with a jack, shank leveling means, and means to sweep the latter in a curved path over the sole of the shoe and entering upon or leaving said sole at the side thereof.

4. A leveling machine provided with a jack, a vibratable shank leveler, and means to swing the same over the sole surface so as to enter or leave the sole at the side thereof.

5. A leveling machine provided with a jack and a plurality of shank levelers, and means to move the same and said jack one relative to another to cause said levelers to enter upon or leave a shoe sole at the side thereof.

6. A leveling machine provided with a jack, a plurality of relatively adjustable shank levelers, and means to move the same and said jack relatively to cause said levelers in their variously adjusted positions to enter upon or leave a sole at the side thereof.

7. A leveling machine provided with a jack, a plurality of shank levelers, means to move the same and said jack relatively to cause said levelers to enter upon or leave a sole at the side thereof, and means to adjust said shank levelers one relative to another in the direction of the length of a shoe.

8. A leveling machine provided with a jack, a leveling device and means to rotate the same about an axis substantially perpendicular to the sole face to be leveled and cause the leveling device to act upon and shape the surface of the shoe sole.

9. A leveling machine provided with a jack, a plurality of leveling devices, and means to rotate the same about an axis substantially perpendicular to the sole face to be leveled.

10. A leveling machine provided with a jack, a leveler, a carrier therefor mounted to rotate about an axis substantially perpendicular to the sole face to be leveled, yielding means connecting said leveler and carrier, and a yielding support for said carrier.

11. A leveling machine provided with a jack, an upright leveling shaft and means to rotate it, and a plurality of levelers yieldingly connected with said shaft.

12. A leveling machine provided with a jack, a carrier rotatable in a plane substantially parallel with the sole face to be leveled, a plurality of levelers connected therewith, and means to arrest the rotation of said levelers leaving the latter outside the outline of the sole operated upon, to permit ready positioning and removal of the shoe.

13. In a leveling machine a jack, a leveler, means for progressively moving said jack and leveler one relative to the other and to cause the latter to enter upon or leave the shoe sole at the side thereof, and means to vibrate said leveler during said progressive movement.

14. A leveling machine provided with a jack, a leveler, means to move the same relatively to cause the leveler to enter upon or leave the sole at a side thereof, means to press said leveler yieldingly to its work, and independent controlling means for said leveler and operating in opposition to said yielding means.

15. A leveling machine provided with a jack, a leveler and means relatively to move the same to cause the leveler to enter upon or leave the shoe sole at a side thereof, and means to change the path of relative movement between said leveler and sole.

16. A leveling machine provided with a movable jack, a leveler, and means to move said leveler relative to said jack during the leveling operation and at another time to move it with said jack.

17. A leveling machine provided with a jack, a leveler, means to move said jack and leveler one relatively to the other to cause the leveler to enter upon or leave the sole at a side thereof, and means simultaneously to move both said jack and leveler without interfering with the relative movement between the two.

18. A leveling machine comprising in combination a jack, a forepart vibratory leveler, a vibrating shank leveler, means to vibrate said levelers and to change the relative positions of said jack and levelers to cause said fore-part leveler to have relative progressive movements longitudinally of the sole and also to cause said shank leveler to have relative movement upon said sole, and means to arrest said relative movements but without arresting said vibratory movements.

19. A leveling machine comprising in combination a jack, a fore-part vibratory leveler, a plurality of vibrating shank levelers, means to vibrate said levelers and to change the relative positions of said jack and levelers to cause said fore-part leveler to have relative progressive movements longitudinally of the sole, and also to cause said shank levelers to have relative movement upon or away from said sole at the edge thereof, and means to arrest said relative movements but without arresting said vibratory movements.

20. In a machine of the character described, the combination of a support for the work, a leveling roll having a pattern extending circumferentially thereof, means for causing relative travel of said support and roll, and means for controlling the rotative movement of the roll during such relative travel.

21. A leveling machine comprising in combination a jack, a leveling roll having a circumferentially patterned periphery, means to produce relative oscillation between said jack and roll, and means to cause said oscillation to progress along the sole surface.

22. A leveling machine comprising in combination a jack, a leveling roll having a circumferentially patterned periphery, means to produce relative oscillation between said jack and roll, means to cause said oscillation to progress along the sole surface, and shank leveling means operable during the relative progression of said roll and jack.

23. A leveling machine comprising in combination, a leveling roll having a circumferentially patterned periphery conforming substantially with the contour of the sole to be treated, a jack, means to move the roll to bring different patterned portions thereof into contact with corresponding portions of the work, and means to relatively vibrate said roll and jack while said corresponding patterned portions of the roll and work are in contact.

24. A leveling machine comprising in combination, a forepart leveling roll having a circumferentially patterned periphery, shank leveling devices to coöperate with said roll in shaping the shoe sole, and means for simultaneously actuating said roll and said shank leveling devices.

25. A leveling machine comprising in combination a jack, a fore-part leveling roll having a circumferentially patterned periphery, a plurality of shank levelers, and means to actuate the forepart and shank levelers and cause their simultaneous action.

26. A leveling machine comprising in combination, a jack, a forepart roll having a circumferentially patterned periphery, and means relatively to move said jack and roll to produce an effective progressive oscillatory movement thereof along the shoe sole to cause a pattern portion roll surface to act upon a corresponding portion of the sole.

27. A leveling machine provided with a jack and leveling means, and means for elevating said jack above the level of said leveling means for removal and positioning of a shoe.

28. A leveling machine provided with a jack leveler shaft and its side shank leveling means, worm and worm wheel mechanism for rotating said shaft, and means for endwise reciprocating said worm.

29. A leveling machine provided with a jack, a plurality of shank levelers, means to rotate one of the same to cause it to sweep in, upon and away from the shoe shank, and gearing to rotate the other from it.

30. A leveling machine provided with a jack, a plurality of shank levelers, means to rotate and vibrate one of the same to cause it to sweep in, upon and away from the shoe shank, and gearing to rotate and vibrate the other from it.

31. A leveling machine provided with a jack, means for moving it into inoperative position, and a rack and pinion for projecting it into shoe receiving and shoe removing position when so moved.

32. A leveling machine comprising, in combination, a jack, means for oscillating the jack, leveling means coöperating therewith and means operable on movement of the jack into inoperative position for raising the jack into position for removal or positioning of the shoe.

33. A leveling machine provided with a jack, leveling means and means to change the relative positions thereof to cause said leveling means to traverse the sole surface from an edge obliquely to the length of the sole.

34. In a machine of the class described, the combination of a jack, leveling means coöperating therewith, means to automatically move the jack into and out of operative relation with the leveling means, and means operated by movement of the jack into inoperative position to raise it relative to the leveling means for the reception or removal of a shoe.

35. A leveling machine having a jack, a shank leveler comprising a tool shaped to level the shank to the desired form, means for sweeping the tool across the shank in a curved path, and adjusting means to vary the portion of the shank swept over by the tool.

36. In a leveling machine a jack, tool holders mounted adjacent the sides of the jack, shaping tools mounted in said holders and means for sweeping the said tools inward and outward across the shank portion of the sole.

37. A leveling machine comprising in combination a shoe supporting jack, a plurality of shank levelers at the opposite sides respectively of said jack and adapted to shape the sole of a shoe mounted on said jack, means relatively to move said jack and levelers to cause the latter to enter upon or leave the sole at the sides thereof, and means for relatively adjusting said shank levelers.

38. In a leveling machine, a shoe supporting jack, shoe leveling means comprising a wiper adapted to enter and leave the sole at a side thereof, and means for moving the same and said jack one relative to the other for progressively moving said wiper to cause it to enter and leave the sole at a side thereof.

39. A leveling machine comprising in combination a shoe supporting jack, a leveling tool adapted to shape the bottom of a shoe, and means for vibrating the same about an axis substantially perpendicular to the sole face operated upon.

40. In a leveling machine comprising in combination a shank former adapted to shape the shank of a shoe sole, and means for vibrating the same across said shank transversely to the length of said sole for shaping the same.

41. In a leveling machine, a shoe supporting jack, a plurality of levelers at opposite sides of said jack, and means relatively to move said jack and levelers and to cause the latter to sweep inwardly towards and outwardly from the sole of a shoe mounted on said jack for progressively leveling said sole.

42. In a leveling machine, a shoe supporting jack, a plurality of levelers at opposite sides of said jack, means relatively to move said jack and levelers and to cause the latter to sweep inwardly toward and outwardly from the sole of a shoe mounted on said jack for progressively leveling said sole, and means simultaneously to vibrate said levelers.

43. In a leveling machine, a shoe supporting jack, a plurality of shank levelers, means for progressively and relatively moving the said jack to cause said levelers to enter upon or leave the sole of a shoe mounted upon said jack at a side thereof, and means for relatively varying the longitudinal position of said levelers relative to said sole to cause one to operate in advance of another.

44. A machine of the type described comprising in combination a form having a circumferentially patterned periphery, a shoe supporting jack, means for producing relative longitudinal progressive movements between said jack and form, means simultaneously to vibrate said form and to oscillate the same, and means for varying the relative progressive movements of said jack and form and the oscillatory movement of the latter for adaptation to different sizes or styles of shoe soles.

45. In a machine of the type described an oscillatory form having a circumferentially patterned peripheral mold adapted to shape a shoe sole longitudinally and laterally, and means for vibrating said form and also to oscillate the same back and forth to present an appropriate face of the mold to the portion of the shoe operated upon correspondingly to mold or shape the same.

46. In a machine of the type described an oscillatory form having a circumferentially patterned peripheral mold face, means for vibrating said form and also to oscillate the same back and forth on its axis to present an appropriate face mold thereof to the portion of the sole operated upon to correspondingly mold or shape the same, and adjusting means for varying the oscillation of said form according to the size or style of shoe operated upon.

47. In a machine of the type described a vibratory form having a circumferentially patterned periphery, a longitudinally moving shoe supporting jack, means for vibrating said form and for progressively oscillating it on its axis during the longitudinal movements of said jack, and means simultaneously to vary the longitudinal movements of said jack and the oscillatory movements of said form for operating upon shoes of different sizes or styles.

48. In a machine of the type described comprising in combination a vibratory and oscillatory form having a circumferentially patterned periphery, a rocking or oscillatory shoe supporting jack, means for oscillating said form and jack to produce progressive movements of one relative to the other, and separate means for vibrating said form to produce attritive action on the work by a patterned portion corresponding to the work contour during the oscillatory movement thereof.

49. A machine of the type described comprising in combination a shoe supporting jack, a fore-part rotary form adapted to be oscillated back and forth on its axis, means for relatively and progressively moving said jack and form, means for oscillating said form on its axis to present varying portions of the active face of said form for correspondingly shaping the part of the sole operated upon, and means simultaneously to impart a vibratory movement to said form.

50. In a machine of the character described the combination of a work support, a pattern surfaced leveling device, means to produce relative progression of the leveling device and work support, and means to cause repeated action of the various portions of the pattern surface of said leveling device on corresponding portions of the work.

51. In a machine of the class described, the combination of a support for the work, a leveling device for acting upon the work, means to controllably present and hold to the work different surface portions circumferential of said leveling device, and means for relatively moving the said support and leveling device.

52. In a machine of the class described, the combination of a support for the work, a leveling device having a pattern surface for acting upon the work, means to controllably present different pattern portions of said leveling device to the work, and means for relatively moving said support and leveling device to produce attritive action upon the work.

53. In a machine of the class described, the combination of a support for the work, a leveling device having a varying pattern surface extending circumferentially of said device for acting upon the work, means to controllably present different pattern portions of said leveling device to the work and means for relatively moving the said support and leveling device to produce attritive action upon the work.

54. A machine of the class described, comprising in combination, a work support, a leveling device having a varying pattern extending circumferentially thereof, means to present a desired portion of said pattern to the work, and means to cause attritive action between the said portion of the pattern and the work.

55. In a machine of the character described, the combination of a support for the work, a leveling device for acting upon the work, means to progressively and controllably present different portions of the leveling device to the work and means for relatively moving said support and leveling device to cause attritive action.

56. In a machine of the class described, the combination of a support for the work, a leveling device having a varying pattern surface for acting upon the work, means to progressively present different portions of the pattern surface to the work and means for relatively moving said support and pattern surface back and forth to cause attritive action.

57. A machine of the class described, comprising, in combination, a leveling roll having a pattern extending about the same, a work support, means for producing relative progressive movements between the leveling roll and support and means for controlling the rotation of said roll during such progressive movement.

58. In a machine of the class described the combination of a work support, a leveling roll, means for producing relative longitudinal movement between the work support and leveling roll, and means for controlling the back and forth rotative movement of said roll to cause attritive action on the work as the roll and work support are relatively moved.

59. In a machine of the class described the combination of a work support, a circumferentially patterned leveling roll and means to relatively move the work support and roll back and forth to cause attritive action upon the work.

60. In a leveling machine of the class described, the combination of a work support, a circumferentially patterned leveling roll, means for progressively presenting different portions of the pattern surface of said roll to the work and means for causing attritive action between the presented portions of the pattern surface and work.

61. In a machine of the class described the combination of a work support, a pattern surfaced leveling device $f^5$, means for relatively progressing the work support and leveling device in the longitudinal direction of the work, positive actuating means for progressively turning the leveling device and means for giving the leveling device a vibrating motion to and fro as it is being thus turned to thereby produce attritive action.

62. In a machine of the class described, the combination of a jack, a leveling device in coöperative relation therewith, a cam, means for actuating said cam, actuating connections between the cam and leveling device and between the cam and jack for moving the jack into and out of operative relation with respect to the leveling device and means operative on movement of the jack into inoperative position to project the jack to shoe receiving position.

63. A machine for leveling the soles of shoes, comprising, in combination, a shank leveling device, a worm and worm wheel for moving it laterally upon and over the sole, and means for reciprocating the worm to impart to the leveling device a to and fro vibration as it is moved over the work.

64. An organized machine for leveling the fore-part and shank of a shoe sole in one operation, comprising in combination a fore-part leveling device and a shank leveling device, means for causing progressive relative movements between each of said leveling devices and the work, and means for causing each of said leveling devices to impart attritive action to the shoe sole during such progressive movements.

65. An organized machine for leveling a shoe sole, comprising in combination, a movable work support, a fore-part leveling device, a shank leveling device mounted to move with the work support, means for causing relative progression of each of said leveling devices and the work support, and means for causing each of said leveling devices to rub the sole during such relative progressive movement.

66. An organized sole leveling machine, comprising in combination, a leveling roll $f^5$, a shaft $f$, and connections between said shaft and roll imparting a vibrating to and fro movement to the roll, a cam $b^3$, and operating connections between the cam and roll for controlling its rotative movement to cause a desired portion of the surface of said roll to be brought into contact with the work as it is vibrated to and fro, as described.

67. An organized machine for leveling shoe soles, comprising, in combination, a leveling roll $f^5$, means to cause a to and fro vibration to said roll, a driving shaft and means intermediate the driving shaft and leveling roll controlling the back and forth rotative movement of said roll as it is vibrated, as described.

68. An organized machine for leveling shoe soles, comprising, in combination a support for the shoe, a leveling roll $f^5$ having a circumferential pattern surface, a shaft, operating connections between the shaft and roll for giving a to and fro vibrating movement to said roll, means for causing a relative progression of the support and roll as the latter is vibrated, and means for controlling rotative movement of the roll to bring corresponding contours of the roll and work into operative relation as the roll is vibrated.

69. In a machine of the character described, the combination of a work support, a leveling device for shaping a shoe sole, a worm and worm wheel for relatively moving the leveling device and work support, and means for moving the worm axially to impart a vibrating relative movement to the leveling device and work support.

In testimony whereof, I have signed my name to this specification, in the presence of two subscribing witnesses.

JOHN J. HEYS.

Witnesses:
FREDERICK L. EMERY,
EDITH E. CHAPMAN.